Dec. 3, 1963 W. C. J. HALFORD 3,112,816
BLOCK AND TACKLE APPARATUS WITH ROPE BRAKE MEANS
Filed Sept. 29, 1960 2 Sheets-Sheet 1

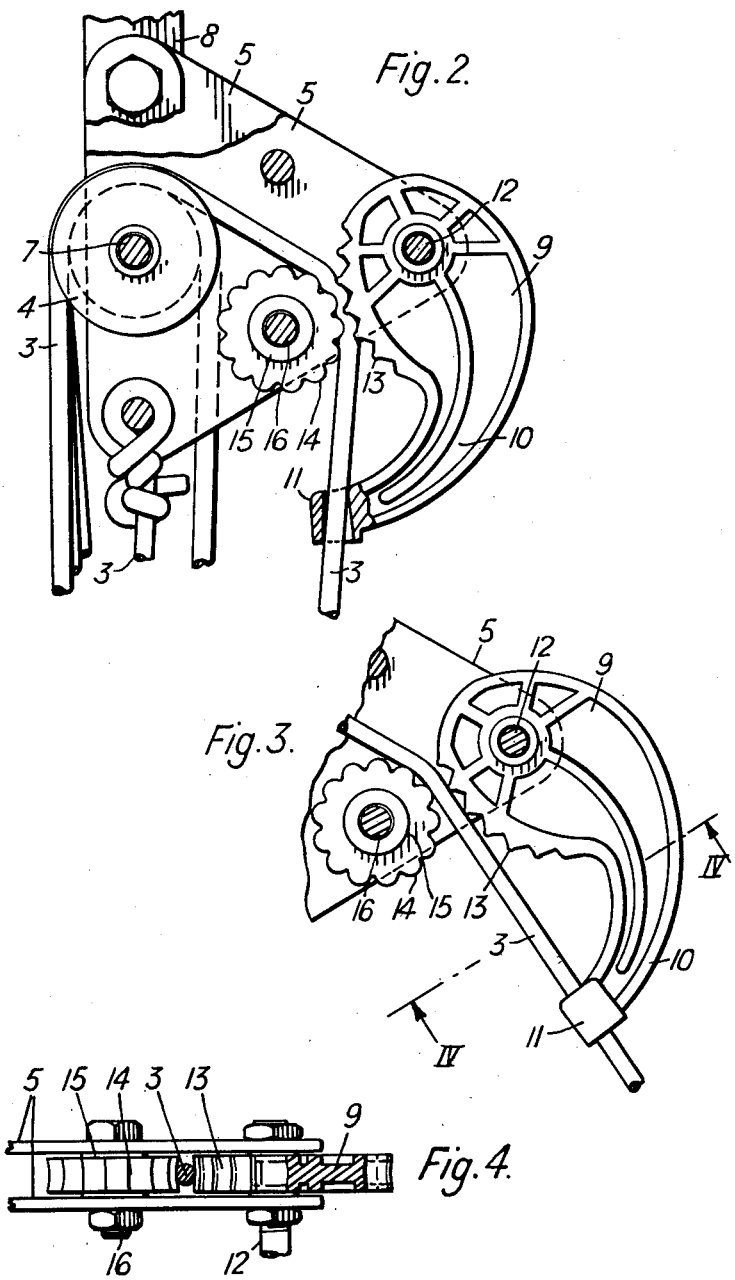

United States Patent Office 3,112,816
Patented Dec. 3, 1963

3,112,816
BLOCK AND TACKLE APPARATUS WITH
ROPE BRAKE MEANS
Wilfrid Charles Julian Halford, Bourne Works,
Weimar St., London, England
Filed Sept. 29, 1960, Ser. No. 59,440
Claims priority, application Great Britain Sept. 29, 1959
3 Claims. (Cl. 188—65.2)

This invention concerns block and tackle apparatus and more particularly, but not exclusively, concerns relatively small or midget apparatus of this character for example for lifting loads of the order of 1,000 to 2,000 lbs.

It is one object of this invention to provide a pulley block, in or for a block and tackle apparatus, having a simple mechanism for locking the rope of the apparatus, when desired, against movement so as to ensure that a load supported by the apparatus may be held in a lifted position without moving downwardly under its own weight when the lifting force is removed.

Another object of the invention is to provide a mechanism which is capable of safely locking a smoothly "lubricated" surfaced rope such as nylon without cutting or damaging such surface.

Thus the present invention provides, in or for block and tackle apparatus, a pulley block having braking means comprising a clamping surface on the block and a brake member pivoted to the block, such brake member having a braking surface facing said clamping surface for gripping between such surfaces a rope part extending from the block and to which load-lifting force is to be applied, said braking surface being eccentrically disposed with respect to the pivot of the brake member whereby rocking of the brake member about such pivot varies the separation of the clamping and braking surfaces, and said brake member having a tail for co-operation with said rope part to cause rocking of the brake member about its pivot between rope part-gripping and rope part-releasing positions in response to alterations in the direction in which such rope part extends from the block.

Preferably the braking surface of the said brake member is roughened to increase the frictional grip of the brake member on the rope. Advantageously this braking surface of the brake member may be notched to provide thereon a series of teeth, preferably of a sinuous or radiused-tip form which deform and wedge the rope between the braking and clamping surfaces.

Conveniently, the said brake member comprises a flat plate mounted for pivoting about an axis perpendicular to its plane and the braking surface is provided by an edge of the said plate.

According to a further feature of this invention, the said clamping surface may very desirably be provided by a roller or spur wheel over which the rope passes and, if desired, the said roller may be mounted on the pulley block so as to be positioned to adjustably regulate the separation between brake member braking surface and the clamping surface provided by the roller for a selected position of the brake member.

Desirably the whole of the block and tackle is made from non-rusting or non-corrodible material and preferably the rope and pulleys are formed of nylon and the brake member and other parts of the pulley blocks are formed of aluminum alloy or any other suitable hard material, e.g. pressed steel fibre or nylon.

In order that this invention may more readily be understood and further features thereof appreciated, one embodiment of the same will now be described by way of example and with reference to the accompanying drawings, in which:

FIGURE 2 is a part-sectional view of the upper pulley block of the apparatus, showing the braking means in engaged condition to prevent a load carried by the apparatus from descending under its own weight;

FIGURE 3 is a fragmentary view of the braking means, showing these in released condition; and FIGURE 4 is a sectional view on line IV—IV of FIGURE 3.

Figure 1:
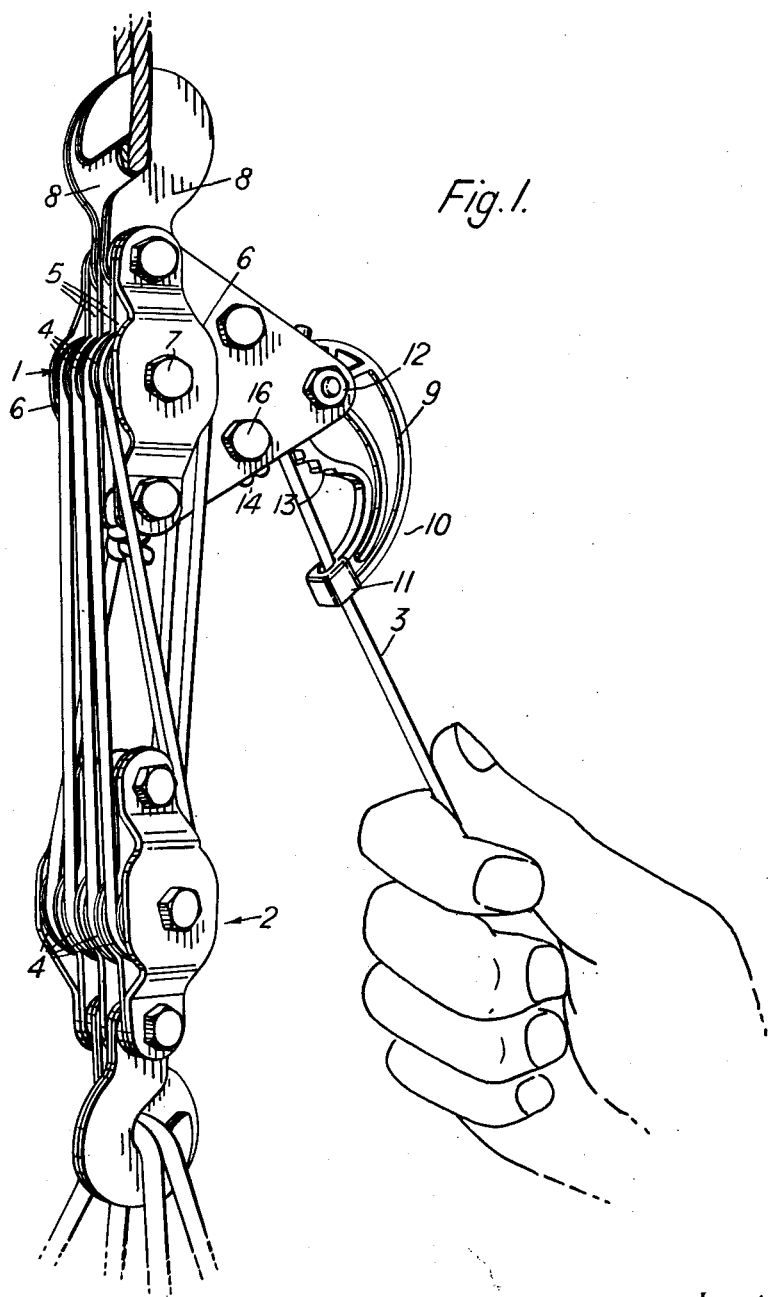
FIGURE 1 is a perspective view of a block and tackle apparatus embodying the invention and shown with the braking means in released condition for raising or lowering of a load by the apparatus.

Referring to the drawings, the block and tackle apparatus illustrated comprises an upper pulley block 1, a lower pulley block 2 and a rope 3 reeved about the pulley wheels 4 of pulley blocks 1 and 2 in a manner hereinafter described; in this apparatus, the pulley blocks 1 and 2 are formed of aluminum alloy and have nylon pulley wheels 4 and the rope 3 is formed of nylon.

The upper pulley block 1 comprises four pulley wheels 4 of equal diameter, in this example having a value of about one and one-quarter inches, mounted coaxially side-by-side on a common spindle. Spacing plates 5 are mounted between adjacent pulley wheels 4 and side plates 6 are mounted outside of each of the outside wheels 4, the side plates 6, pulley wheels 4 and spacing plates 5 being bolted together by a bolt 7 passing therethrough and forming the said pulley wheel spindle, washers conveniently being provided between the side plates 6 and outer pulley wheels 4. Each of the spacing plates 5 is of uniplanar form and extends to positions above and below the periphery of the pulley wheels 4 (in this example at a distance of about one and one-quarter inches therefrom) and each of the side plates 6 also extends above and below the pulley wheels, but has its upper and lower parts cranked or bent so that the extreme upper and lower end portions of the side plates 6 flatly abut the upper and lower parts respectively of the adjacent spacing plates 5, the side plates 6 and spacing plates 5 being bolted together, spacing sleeves being provided between the spacing plates 5 where these are bolted together below the pulley wheels 4 and suspension hooks 8 being provided between the spacing plates 5 where these are bolted together above the pulley wheels 4.

Each of the said suspension hooks 8 comprises a flat plate of hook-like form and two pairs of the said plates are provided, the hooks of one pair having their hook mouths facing in the opposite directions to the mouths of the hooks of the other pair so that the pulley block cannot be accidentally unhooked from any suspension member engaged by the hooks.

An adjacent two of the three spacing plates 5 extend rearwardly of the pulley wheels 4, these two plates 5 being of substantially triangular form, two apices of the triangle being located respectively vertically above and below the pulley wheels and the third apex being located rearwardly of these wheels and slightly below the level of the axis thereof. To the third apex of each of the triangular spacing plates and between the latter is pivoted a brake member 9 comprising a nylon moulding which is of substantially planar form, the plane of the member 9 being parallel to the planes of the triangular spacing plates 5, and has a shape similar to that of a comma, i.e. has a rounded head and a curved tail 10 which extends downwardly from the main rounded portion. The brake member 9 is mounted so as to pivot in its own plane and the tail 10 extends inwardly towards the pulley block and has at its extreme end an eye 11 in a plane at right angles to the plane of the member. The pivot of the brake member 9 comprises a bolt 12 passing eccentrically through the rounded head of the member 9 and the inner edge of this head is of notched form to provide thereon a series of round-tipped teeth 13 constituting a sinuous braking surface of the member.

A roller 14 is also mounted between the two triangular spacing plates 5 to be located forwardly of the brake member and spaced therefrom by a distance which is, when the brake member 9 is moved about its pivot so that the tail 10 of this member occupies its fully forward position, less than the diameter of the rope 3, the arrangement being such that rearward movement of the tail 10 of the brake member increases the distance between the roller 14 and the braking surface of the member 9 and subsequent forward movement of the said tail 10 decreases this distance.

The roller 14 is mounted rotatably on a bush or bushing 15 which is bolted to the triangular spacing plates 5 by a bolt 16 passing through the bush 15. If desired, the bolt 16 may pass eccentrically through the bush 15 to enable the position of the roller 14 relatively to the brake member 9 to be adjusted by rotation of the bolt 16 and bush 15 between the triangular spacing plates 5.

The roller 14 and bush 15 are each formed of a suitable non-corrodible material, e.g. nylon, aluminum alloy or brass.

The lower pulley block 2 is of similar form to the upper pulley block 1, except that none of the spacing plates 5 thereof has a rearward extension and hooks 8 are provided on the lower, instead of the upper, of the two bolts securing the side plates 6 and spacing plates 5, the hooks 8 comprising two pairs of hook plates facing in the opposite directions.

The pulley rope 3, which in this example is a slippery surfaced, braided nylon cord of three-sixteenths inch diameter is secured to the lower part of the upper pulley block 1 around the spacing sleeves below the inside pulley wheels 4 and from this position passes downwardly and around one inside pulley wheel 4 of the lower block 2, then passes upwardly and around that inside pulley wheel of the upper block which is not situated between the triangular spacing plates 5, then passes downwardly and around that outside pulley wheel of the lower pulley block 2 adjacent to that inside wheel of this block 2 around which the rope last passed, then passes upwardly and around the corresponding outside pulley wheel of the upper pulley block 1 in a rotational direction opposite to that in which the rope passed around the adjacent inside pulley wheel of such block, then passes downwardly and around the remaining inside pulley wheel of the lower pulley block 2, then passes upwardly and around the other outside pulley wheel of the upper block, then passes downwardly and around the other outside pulley wheel of the lower block in the opposite rotational direction, and finally passes upwardly and around that inside pulley wheel of the upper block which is located between the triangular spacing plates 5 and rearwardly over the roller 14 between the latter and the brake member 9 and through the eye 11 in the brake member tail 10.

In use of the above described block and tackle apparatus, it will be appreciated that if the part of the rope 3 to which the lifting force is applied is pulled along a line extending obliquely to the vertical and outwardly of the upper pulley block 1, i.e. along the line which the rope takes between the last pulley wheel 4 of the upper block over which it passes and the roller 14, (see FIGURE 3) the brake member tail 10 will be in a rearward position and the rope may move freely between the gap between the brake member teeth 13 over the brake roller 14 thereby to enable any load which may be suspended on the lower pulley block 2 to be raised or lowered. If, however, the rope 3 is pulled vertically downwardly, or downwardly and forwardly, so that the tail 10 of the brake member 9 is pulled forwardly, the swinging of the head of the brake member about its eccentric pivot will cause the teeth 13 to engage the part of the rope between the latter and the brake roller 14 and press this rope part tightly against the latter (as shown in FIGURE 2), which thus forms a clamping surface for the rope, so as to lock it at any desired point.

It will be noted that the periphery of the roller 14 is formed with large rounded teeth or a scalloped edge which would engage the rounded tips of teeth 13 of the braking surface of the brake member 9 but for the presence of the rope 3 therebetween. Accordingly and as shown in FIGURE 2, the braking surface of the brake member and the periphery of the roller 14 co-act to deform the compressible rope part gripped therebetween and cause it to follow a sinuous path providing a considerable area of engagement between the rope and the roller and braking surface so as to wedge a substantial length of the rope between the larger and smaller teeth on the clamping and braking surfaces respectively. This means of locking the rope by such wedging action diffuses the clamping loads over a considerable area of the rope surface and thereby prevents cutting and minimises wear thereof while ensuring good gripping of the slippery surfaced nylon rope.

It will further be noted that tension loads in the rope part above that gripped between the teeth 13 and roller 14 tend to rock the brake member to bring the teeth 13 into firmer gripping engagement with the rope so that this servo-acting brake means is substantially self-energising in the sense that the greater the tension in the rope between the pulley blocks 1 and 2 the more intense will be the grip of the brake means on even lubricated nylon rope to prevent its slipping under such loads.

Finally it will be noted that the small widely spaced teeth 13 are of rounded-tip form to provide a series of concentrated pressure points which minimise peak compressive forces on the rope when gripped between such points and the scalloped edge of roller 14, thereby to minimise the risk of the rope being cut or damaged by such forces. Such diverse rounded gripping surfaces brake the rope from slipping by retaining a greater length of it deformed within the sinuous path in a wedged condition. The tips are preferably spaced in the direction of the path by at least the diameter of the rope and the indents between the tips are at least one half of the rope's diameter in depth.

The illustrated block and tackle apparatus above described is suitable for lifting loads up to 1,000 lbs., the actual maximum load at which failure occurred when one such block and tackle apparatus was tested being 1,890 lbs.

Although the invention has been particularly described with reference to a block and tackle for raising relatively low loads of the order of 1,000 lbs. and in which the upper and lower pulley blocks each comprise four pulley wheels, it will be appreciated that the braking means described may equally well be used on block and tackle apparatus for lifting heavier loads and/or comprising pulley blocks including any number of pulley wheels.

The forms of the invention here described and illustrated are presented merely as examples of how the invention may be embodied and applied. Other forms, embodiments and applications of the invention, coming within the proper scope of the appended claims, will, of course suggest themselves to those skilled in the art.

I claim:

1. In combination with a pulley block having a series of pulley wheels and a compressible, slippery surfaced rope of small cross-section, a means for braking such rope without tearing or melting its fibers when load lifting force is released therefrom, said means comprising a pair of supporting members extending rearwardly from said wheels, a roller rotatably mounted between said supporting members for feeding such rope from said wheels, a rod extending transversely between said supporting members, a flat brake member pivotally mounted on said rod, said brake member provided with a rounded head portion proximate said roller and a narrow arched tail portion extending from said head portion, an eye disposed in the end of said tail portion through which such rope passing over said roller is fed, a first series of large rounded teeth disposed on said roller and a second series of smaller rounded teeth disposed on said head portion to form a sinuous path therebetween, said second series of teeth provided with small tips adapted to apply separate points of concentrated pressure against said first series of teeth and larger indents disposed between said tips, said tips being spaced in the direction of said path by at least the diameter of such rope and said indents being at least half the diameter of such rope in depth, said first and second series of teeth cooperating to deform and wedge such rope within said sinuous path and lock it therein when such force is released.

2. A means for braking slippery surfaced rope according to claim 1, wherein the cooperating teeth on said roller and said head rock into a servo-acting braking means which automatically increases the wedging engagement with such rope in direct proportion to the pull of such load between said wheels.

3. A means for braking slippery surfaced rope according to claim 1, wherein said first series of teeth comprises a series of scallops disposed around the peripheral edge of said roller, and wherein said points of concentrated pressure are directed laterally against each of said scallops when said means is in braking position.

References Cited in the file of this patent

UNITED STATES PATENTS

| | | |
|---|---|---|
| 284,451 | MacCarty | Sept. 4, 1883 |
| 476,969 | Warner | June 14, 1892 |
| 485,954 | Lester | Nov. 8, 1892 |
| 1,167,295 | Hall | Jan. 4, 1916 |
| 1,961,081 | Schrader | May 29, 1934 |
| 2,955,560 | Howington | Oct. 11, 1960 |

FOREIGN PATENTS

| | | |
|---|---|---|
| 542,764 | Canada | June 25, 1957 |